March 14, 1961 R. L. CULBERTSON 2,974,673
ALTITUDE COMPENSATED CONTINUOUS FLOW OXYGEN REGULATOR
Filed June 9, 1958 3 Sheets-Sheet 2
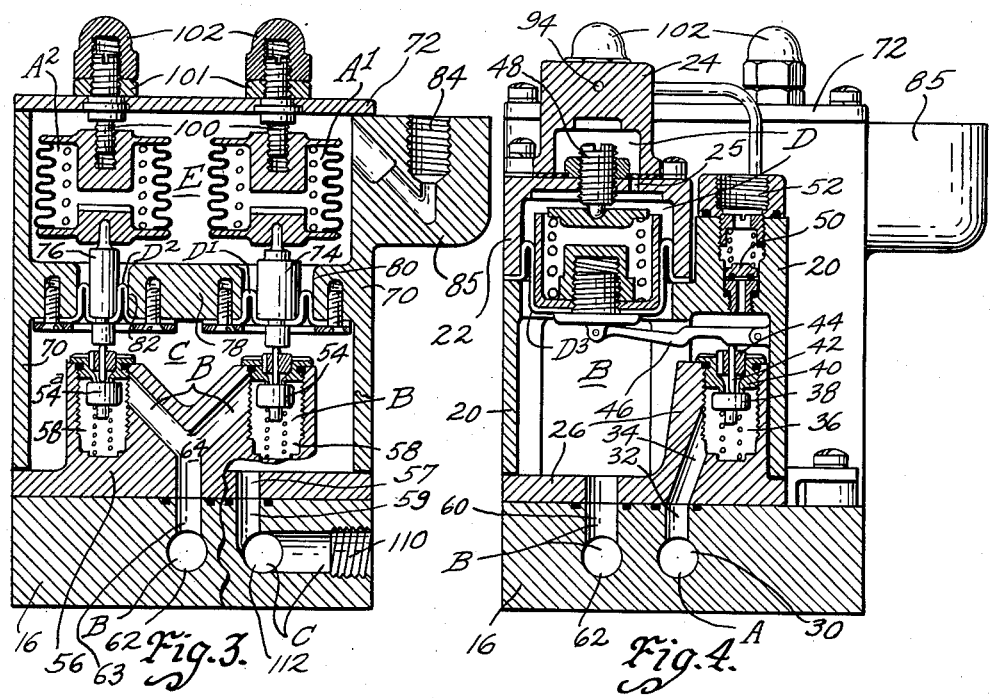
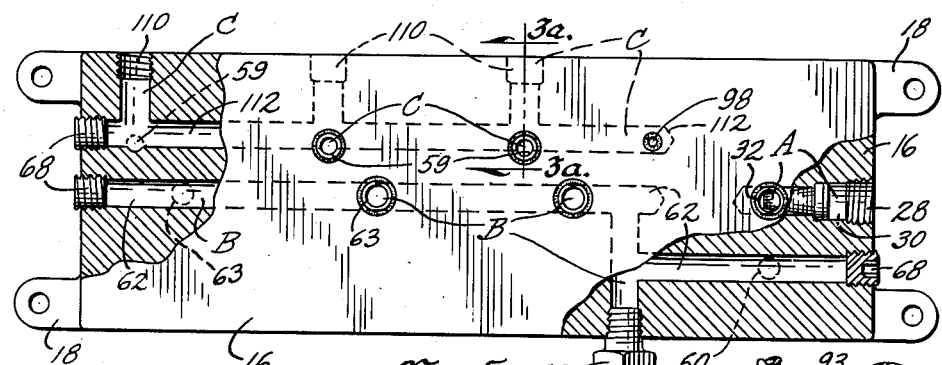
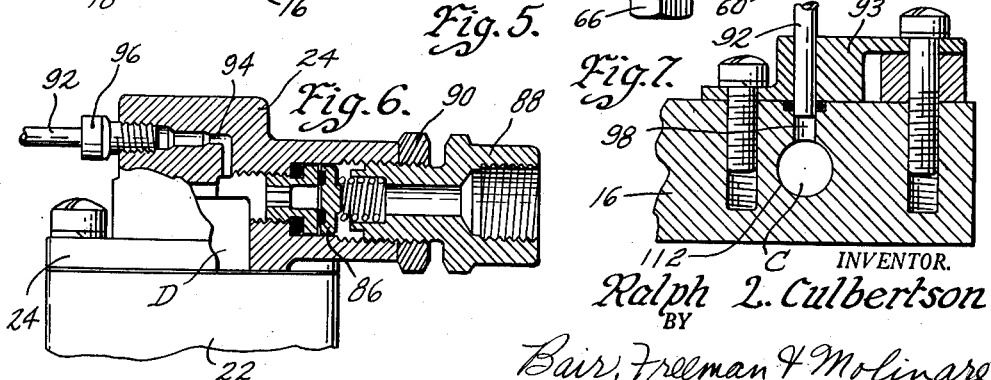
INVENTOR.
Ralph L. Culbertson
BY
Bair, Freeman & Molinare
Attys.

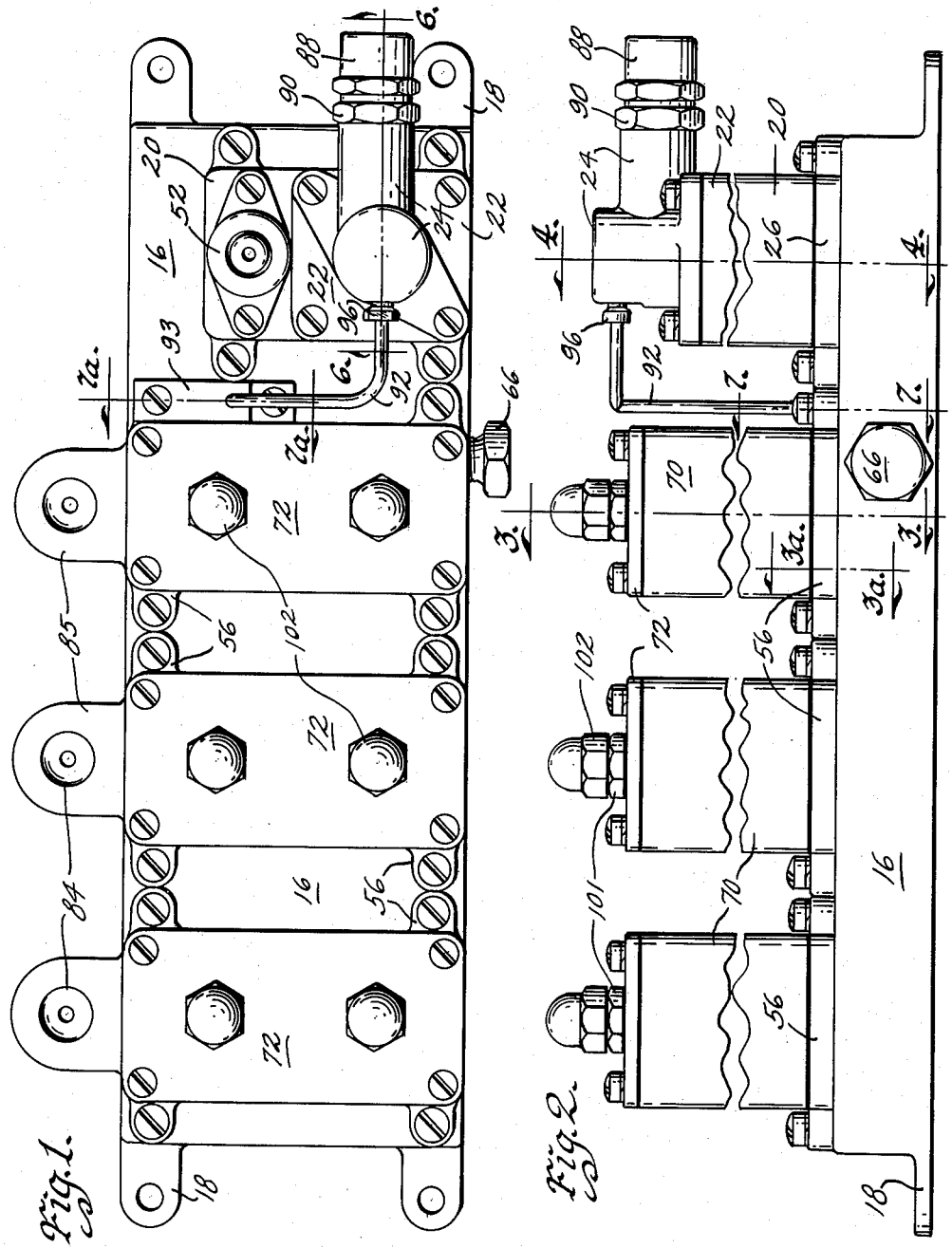

March 14, 1961 R. L. CULBERTSON 2,974,673
ALTITUDE COMPENSATED CONTINUOUS FLOW OXYGEN REGULATOR
Filed June 9, 1958 3 Sheets-Sheet 3

INVENTOR.
Ralph L. Culbertson
BY Bair, Freeman & Molinare
Attys.

United States Patent Office 2,974,673
Patented Mar. 14, 1961

2,974,673

ALTITUDE COMPENSATED CONTINUOUS FLOW OXYGEN REGULATOR

Ralph L. Culbertson, Bryan, Ohio, assignor to The Aro Equipment Corporation, Bryan, Ohio, a corporation of Ohio Filed June 9, 1958, Ser. No. 740,667
9 Claims. (Cl. 137—64)

This invention relates to a continuous flow oxygen regulator which is altitude compensated in such manner as to secure a desired flow-to-altitude relationship.

One object of the invention is to provide an oxygen regulator particularly adapted for mass flow of oxygen to a number of passengers in an aircraft, each receiving oxygen through a metering orifice, the regulator being designed for efficient operation without using a quantity of oxygen greater than required but having a performance curve that follows a desired curve that secures the desired efficiency.

Another object is to provide an oxygen regulator of the type having a first stage which is automatically controlled as to pressure in respect to an oxygen supply at much greater pressure than required, and which pressure diminishes as the supply is exhausted, with automatic altitude compensation for the flow of the first stage oxygen to an outlet from which the aircraft passengers receive their oxygen supply.

A further object is to provide a plurality of second stage valves between the first stage chamber of the oxygen regulator and the outlet chamber thereof which are sequentially operable in an automatic manner as altitude increases for securing a desired outlet pressure curve pattern whereas a single such altitude compensated valve cannot secure such results.

With these and other objects in view, my invention consists in the construction, arrangement and combination of the various parts of the altitude compensated continuous flow oxygen regulator herein disclosed, whereby the objects above contemplated are attained, as hereinafter more fully set forth, pointed out in my claims and illustrated in detail on the accompanying drawings, wherein:

Fig. 1 is a plan view of an altitude compensated continuous flow oxygen regulator embodying my invention;

Fig. 2 is a side elevation thereof, intermediate portions of the regulator being cut away to conserve space on the drawings;

Fig. 3 is an enlarged vertical sectional view on the line 3—3 of Fig. 2, a portion of the lower right-hand corner of the figure being on a section line indicated 3a—3a in Figs. 2 and 5;

Fig. 4 is an enlarged vertical sectional view on the line 4—4 of Fig. 2.

Figure 8:
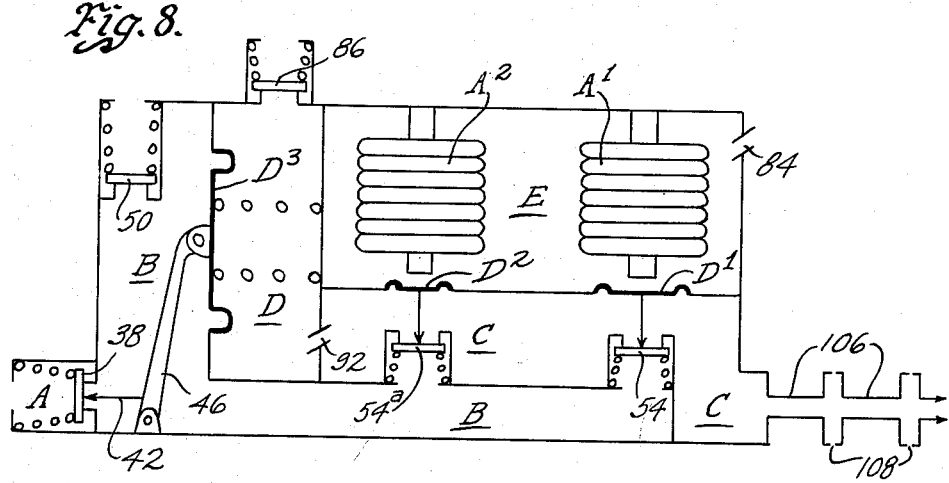

Fig. 5 is a plan view of the base of the regulator shown on a reduced scale with respect to Fig. 1, portions thereof being broken away to show certain connecting passageways in the base;

Fig. 6 is an enlarged sectional view on the line 6—6 of Fig. 1;

Fig. 7 is an enlarged sectional view on the line 7—7 of Fig. 2 which sectional view is also indicated by the line 7a—7a of Fig. 1;

Fig. 8 is a diagrammatic view of the regulator for the purpose of explaining its operation; and Figs. 9 to 15 are representative curves with respect to oxygen flow in relation to altitude, outlet pressure in relation to altitude and other factors involved in the design of my regulator.

On the accompanying drawings, and referring first to Fig. 8 showing the complete regulator system, the regulator has a plurality of chambers therein as follows:

(A) Inlet chamber.
(B) First stage chamber.
(C) Outlet chamber.
(D) First stage back pressure chamber.

These chambers may also be identified throughout Figs. 3 to 7 by the same reference characters A, B, C and D, applied both to the chambers and to the connecting passageways which will be later described.

The chambers referred to are formed by a base and certain housings illustrated in detail in Figs. 1 to 7. The base is indicated at 16 and at the right-hand end thereof in Fig. 2 is a first stage housing 20, a first stage back pressure housing 22 and a cap 24 which are suitably secured together and to the base 16 by screws as illustrated. A first stage valve housing 26 (see Fig. 4) is interposed between the base 16 and the housing 20. Suitable gaskets are provided between the housings 20 and 26 and the housings 22 and 24 to prevent leakage, whereas the edge of a first stage diaphragm $D^3$ serves as a gasket between the housings 20 and 22. The cavities within the housings 22 and 24 communicate through a port 25 shown in Fig. 4.

An oxygen inlet 28 (see Fig. 5) at the right-hand end of the base 16 is connected with a source of oxygen supply under high pressure such as 2000 p.s.i. and the inlet communicates with a passageway 30 in the base 16 from which a port 32 extends upwardly (Fig. 4) to connect with a passageway 34 leading into a cavity 36 in the first stage valve housing 26. The top of this cavity is closed by a valve seat 40 in which is a valve stem guide 44 for a valve stem 42. A spring-closed first stage metering valve 38 is normally closed against the valve seat 40 and the stem 42 serves as a thrust pin between the valve 38 and a pivoted lever arm 46.

The arm 46 is operatively connected to the diaphragm $D^3$ which is spring depressed as illustrated in Fig. 4, and the tension of the spring may be adjusted by an adjusting screw 48 located within the cap 24.

The chamber B is provided with a spring-closed relief valve 50 to automatically open and relieve any excessive pressure resulting from malfunctioning of the regulator. The relief valve 50 thereby prevents any dangerous buildup in pressure within the chamber B. The outlet from the relief valve 50 terminates in a threaded boss 52 adapted to have a line connected therewith for a discharge of the relieved oxygen to the outside of the aircraft.

Referring to Fig. 8, a pair of second stage spring-closed metering valves 54 and 54ª are provided between chambers B and C. These are also shown in Fig. 3, mounted in an aneroid housing 70, and their construction is similar to the valve 38 in Fig. 4. They are mounted in a second stage valve housing 56 interposed between the base 16 and an aneroid housing 70. The housing 56 has cavities 58 therein which are connected with the chamber B in the housing 20 by passageways 60 and 62 in Fig. 4 and 62, 63 and 64 in Fig. 3. The passageway 62 extends through the base 16 as shown in Fig. 5 and a test plug 66 may be provided for removal so that the chamber B can be connected with test equipment for testing and adjusting the regulator after it is assembled. The ends of the passageway 62 are plugged as at 68 (see Fig. 5).

In Fig. 3 is shown the second stage valves 54 and 54ª which are located on the line 3—3 of Fig. 2, and to the left of the housing 70 in which they are mounted are two similar housings 70 of the same construction as shown in Fig. 3. The three housings 70 are connected in parallel for increasing the supply of oxygen as to 100 passengers whereas only one of the units as shown in Fig. 3 will supply only 50 passengers on the basis of each valve 54 and 54a supplying 50 passengers but one extra valve being always provided as a safety factor.

The aneroid housing 70 covers the second stage metering valves 54 and 54a and provides the chamber C as well as a chamber E in conjunction with a cover plate 72. The chamber C within the housing 70 communicates through passageways 57 and 59 with a passageway 112 in the base 16 terminating in outlets 110. Aneroids $A^1$ and $A^2$ are located in chamber E and are operatively connected with the valves 54 and 54a by plungers 74 and 76. The plungers are sealed relative to a central partition 78 of the aneroid housing 70 by diaphragms $D^1$ and $D^2$. The diaphragms are not sectioned in Fig. 3 and are shown as heavy black lines in Fig. 8 for clarity. The partition 78 has perforations 80 and 82 therein for the diaphragms $D^1$ and $D^2$ respectively and these perforations define the areas of the diaphragms, the effective areas of the aneroids $A^1$ and $A^2$ being somewhat larger than the areas represented by the perforations 80 and 82. Also, it will be noted that the area of the diaphragm $D^1$ is greater than the area of the diaphragm $D^2$, the purpose of which will hereinafter appear.

Each aneroid housing 70 has a vent 84 to atmosphere in a boss 85 of the housing 70 which also serves as a test port. For convenience in testing the regulator while mounted in the aircraft, this port is threaded so that a vacuum line can be attached and altitudes can be simulated within the aneroid chamber E without removing the entire regulator and placing it in an altitude chamber. By having one test port 84 for each of the three units illustrated, they can be tested individually.

Referring to Fig. 6, the chamber D is closed to atmosphere by a spring-closed back pressure relief valve 86. The tension of the spring may be adjusted by a nipple 88 threaded into the cap 24 and the adjustment retained by a lock nut 90. The back pressure relief valve 86 protects the system in case of a failure in the first stage back pressure chamber D, as if the outlet pressure increases, the first stage pressure would also increase and finally would continue until the entire system would be at a pressure equal to the inlet gas pressure. To prevent this, the relief valve is set at a predetermined pressure limiting the final system pressure in case of a failure such as any leakage or failure of a second stage valve which would cause the outlet pressure in the chamber C to increase because of a tube connection 92 between the chambers C and D. The tube connection 92 has its lower end entering a passageway 98 as in Fig. 7 which communicates with a passage 112 (chamber C). A holding clip 93 is provided for the tube 92 and a suitable O-ring seal is used as illustrated. The tube has its upper end passing through a fitting 96 and entering the cap 24 as shown in Fig. 6, communicating therein with the chamber D by means of a passageway 94. This connection feeds back the pressure from chamber C against the back pressure side of the diaphragm $D^3$ to maintain the proper balance of pressures for obtaining the desired pressure regulation and oxygen quantity flow dependent upon altitude as reflected in the expansion of the aneroids $A^1$ and $A^2$ as they open the second stage metering valves 54 more or less depending upon altitude affecting the aneroids through the vents 84 to atmosphere. Seals between the base 16 and the housings 26 and 56 are effected by suitable O-rings around the passageways 32, 59, 60 and 63 (see Figs. 3, 4 and 5). These seals are shown stippled in Fig. 5.

Figure 9:
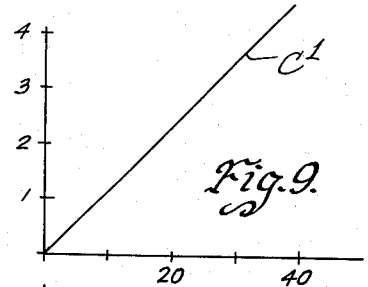

The performance of a continuous flow oxygen system such as disclosed operates preferably as depicted by the curve $C^1$ in Fig. 9 wherein the base line indicates altitude and is graduated in thousands of feet. The vertical line indicates flow in standard liters per minute and is the recommended mass flow received by each passenger or user of the oxygen regulator. In Fig. 8, a supply line 106 is shown from the chamber C to the passengers and each passenger is supplied through an orifice 108, and the line 106 being connected of course to one of the three outlets 110 of the chamber C shown in Figs. 3 and 5.

Figure 10:
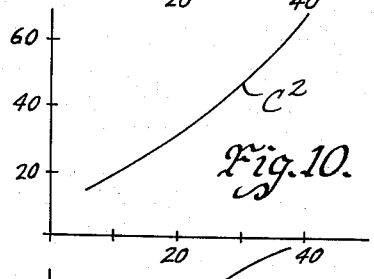

Since the flow to each passenger is controlled by an orifice or other type of flow restrictor, it is necessary for the regulator itself to change its outlet pressure in comparison with ambient altitude. When converting the passenger mass flow into terms of pressure required to produce this flow through the passenger orifice, it is found that the resulting pressure-altitude curve $C^2$, as shown in Fig. 10, is not linear as the curve $C^1$ in Fig. 9. The vertical line in this case indicates outlet pressure in pounds/square inch absolute. In order for the system to be efficient without using a quantity of oxygen greater than required, it is important that the regulator outlet performance curve be as close as possible to the requirements represented by the curve $C^2$ of Fig. 10. Thus, we have the desired performance curve $C^2$ as a starting point for the design of a regulator.

Figure 11:
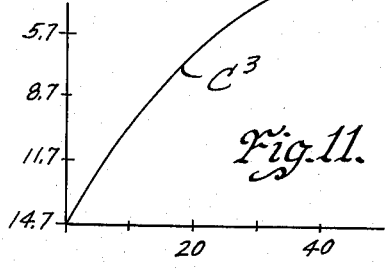

In producing an altitude compensated regulator the only changing force that can be utilized is the absolute pressure curve. This is shown in Fig. 11 at $C^3$, the vertical line indicating atmospheric pressure absolute. As will be noted the curve $C^3$ is not a linear curve either, and curves in the opposite direction compared to the desired curve $C^2$ of Fig. 10.

If a standard control section of this type of regulator would be tested, the resulting pressure-altitude curve would be approximately the curve $C^3$ of Fig. 11 in place of the desired curve $C^2$ of Fig. 10. The angle and/or location of the curve can be changed by the area ratios as between the effective areas of the aneroids $A^1$ and $A^2$ and the diaphragms $D^1$ and $D^2$ (as represented by the diameters of the perforations 80 and 82 in the partition 78 of Fig. 3) and/or by adjustment of the aneroids $A^1$ and $A^2$ by means of their adjusting screws 100.

In order to overcome the foregoing problems I utilize the design shown in Fig. 8 with reference to the chambers A, B and D which comprise a first reduction stage, and the chambers C and E which comprise an altitude compensated second stage. The total number of second stages is dependent upon the application. For instance, if each second stage section is rated at approximately 50 persons per section and the requirement is for 100 people, two sections are required plus one for safety, giving a total of three. Only one section is shown in Fig. 8 whereas three are shown in Fig. 1 for 100 people.

The oxygen supply enters the regulator at the inlet 28 of Fig. 5 (chamber A in Fig. 8) and flows through the first stage metering valve 38, the pressure of which is controlled by the spring loaded diaphragm $D^3$ which, when loaded to a predetermined point, moves back and through lever 46 closes the metering valve and stops the inlet flow of oxygen to the first stage or chamber B.

The first stage pressure in chamber B flows to the second stage metering valves 54 and 54a. These valves in turn control the flow of oxygen to the outlet chamber C and consequently to the supply line 106 and the orifices 108 for the aircraft passengers. Since the valves 54 and 54a are controlled by the aneroids $A^1$ and $A^2$ respectively, with increasing altitude these aneroids expand and react through the diaphragms $D^1$ and $D^2$ to control the valves 54 and 54a and thereby the outlet pressure in the aircraft's oxygen distribution system connected with the chamber C.

As previously mentioned the resultant slope and position of the performance curves $C^3$, $C^4$ and $C^5$ can be varied. The slopes are controlled by the ratio of the sensing area or diaphragm $D^1$ and the effective area of the aneroid $A^1$ and also of sensing area $D^2$ and aneroid $A^2$. As will be noted, the ratio of area $D^1$ to area $A^1$ is quite small; hence, a rather flat curve results as shown at $C^4$ in Fig. 12, whereas a greater ratio as between $D^2$ and $A^2$ produces a steeper curve such as $C^5$ in Fig. 13. When these altitude compensated second stage metering valves are connected in parallel as in Fig. 8, the resultant curve is a composite $C^{4\prime}$ plus $C^{5\prime}$ as in Fig. 14.

Figure 12:
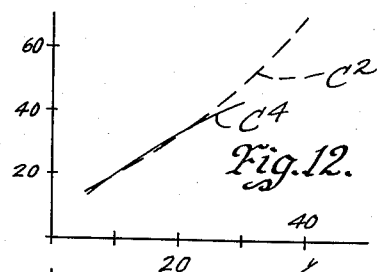
Figure 13:
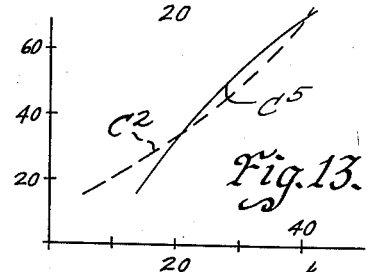
Figure 14:
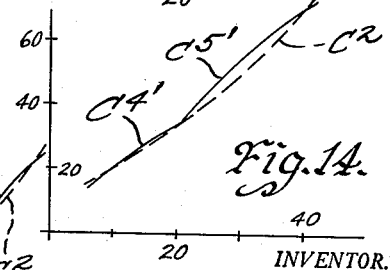

I have illustrated the curve $C^2$ of Fig. 10 (representing the desirable curve) by dotted lines in Figs. 12, 13 and 14 to show that the slopes of curves $C^4$ and $C^5$ approximately match portions thereof and the curves $C^{4\prime}$ and $C^{5\prime}$ of Fig. 14 therefore produce composite curve that quite closely follows the curve $C^2$ even though the curvatures are opposite. Thus the combination of aneroids $A^1$ and $A^2$ with their diaphragms $D^1$ and $D^2$ approximately produce the curve $C^2$.

Figure 15:
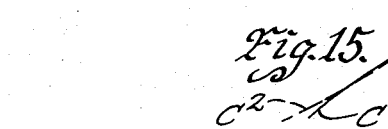

By the use of additional aneroid-second stage valve combinations the curve $C^2$ may be even more closely approached as illustrated in Fig. 15 wherein the curves $C^{4\prime}$ and $C^{5\prime}$ are shown and a third curve $C^6$ is produced by a third aneroid and diaphragm combination which extends the operating curve of the regulator beyond that illustrated in Fig. 14. This is especially desirable for higher altitudes as the curve $C^2$ continues to swing upwardly. Thus, in a regulator using three or more second stages it is possible to use more than just two curves as described in connection with Figs. 13 and 14 to result in a final curve even more closely compared to the desirable curve $C^2$ of Fig. 10.

The passenger orifices 108 of Fig. 8 control the flow of oxygen to each passenger. One of these orifices is in communication through suitable tubing with each passenger's mask in the usual manner. The quantity of flow is dependent on the pressure drop across the orifice. This pressure drop is the difference between the ambient altitude pressure and the system pressure which is the same as the pressure in the second stage or outlet chamber C.

On increasing altitude the aneroid $A^1$ is first to expand which reacts through the diaphragm $D^1$ to open the valve 54 and allows a flow of oxygen from the first stage chamber B to the outlet chamber C to meet the pressure requirements of the aneroid. As mentioned before the ratio of the aneroid area to sensing area is small, reflecting a flat curve such as $C^4$ for the lower altitudes.

With further increasing altitude the aneroid $A^2$ responds through the diaphragm $D^2$ to open the valve 54ᵃ and allow oxygen to flow from the first stage chamber B to the outlet chamber C. As shown, the ratio of the aneroid area $A^2$ to the diaphragm area $D^2$ is quite great giving a steep curve or the higher altitude section $C^5$ thereof. After the aneroid $A^2$ takes over, the additional pressure reacting against the diaphragm $D^1$ allows the valve 54 to close so that all flow at high altitudes is metered through the valve 54ᵃ.

The tubing connection 92 and passageways 98 and 94 allow the outlet pressure in the chamber C to react in the first stage back pressure chamber D against the back of the diaphragm $D^3$ which controls the first stage pressure in the chamber B to a given amount above the outlet pressure in the chamber C. This provides a constant pressure difference between the valves 54 and 54ᵃ and results in a constant opening force or pressure effect on these valves even though the outlet pressure increases with higher altitude.

The intended function of an altitude compensated continuous flow regulator is to provide oxygen to the user in increasing amounts with increasing altitudes. This has heretofore been done with a single second stage metering valve type of regulator which controls the oxygen outlet pressure in the system fed to the passengers through aircraft mounted orifices. With increasing altitudes the regulator produces an increased outlet pressure which in turn through the orifice is breathed by the user.

With this increased outlet pressure the pressure differential across the orifice is increased causing a greater flow of oxygen to the user. Such a regulator is not of the demand type in that it regulates the outlet pressure only and the aircraft orifice system meters the flow to each user, therefore the name "continuous flow" is applied to this type of system.

These prior regulators could not produce the desired performance curve $C^2$ of Fig. 10 whereas the use of a plurality of second stage, altitude compensated metering valves operating sequentially as herein disclosed can produce a close approximation, thereby using oxygen efficiently as well as automatically meeting more exactly the varying oxygen requirements at all altitudes. The first stage metering valve 38 of my regulator reduces the normal high (2,000 p.s.i.) inlet pressure to a more usable pressure and the altitude compensated final reduction stage maintains a variable outlet pressure commensurate with the altitude requirements with a comparatively simple arrangement of second stage valve-aneroid combinations arranged in parallel but operating in sequence.

Some changes may be made in the construction and arrangement of the parts of my altitude compensated continuous flow oxygen regulator without departing from the real spirit and purpose of my invention, and it is my intention to cover by my claims any modified forms of structure or use of mechanical equivalents which may reasonably be included within their scope.

I claim as my invention:

1. An altitude compensated continuous flow oxygen regulator having a first stage chamber, an outlet chamber, a first stage back pressure chamber, a first stage metering valve between a supply of oxygen and said first stage chamber, a diaphragm between said first stage chamber and said first stage back pressure chamber, and operatively connected to said first stage metering valve to control the same, a plurality of second stage metering valves between said first stage chamber and said outlet chamber, a plurality of diaphragms between said outlet chamber and atmosphere, an aneroid for each of said second stage metering valves to open the same upon increase in altitude, each of said aneroids actuating its respective second stage metering valve through one of said plurality of diaphragms and the area ratios of said plurality of diaphragms to said aneroids being different whereby one of said second stage metering valve-aneroid combinations opens during low altitudes to provide a substantially flat performance curve and another of said second stage metering valve-aneroid combinations takes over and opens during higher altitudes to provide a substantially steeper performance curve, and a feed back connection between said outlet chamber and said first stage back pressure chamber to impose the outlet pressure on that side of said first stage diaphragm which tends to open said first stage metering valve as the pressure in said feed back connection increases.

2. An altitude compensated continuous flow oxygen regulator having a first stage chamber, an outlet chamber, a first stage metering valve between a supply of oxygen and said first stage chamber, a diaphragm responsive on one side to pressure from said first stage metering valve and on the other side to biasing means, said diaphragm being connected to said first stage metering valve to control the same, a plurality of second stage metering valves between said first stage chamber and said outlet chamber, a plurality of diaphragms between said outlet chamber and atmosphere, and an aneroid for each of said second stage metering valves to open the same upon increase in altitude, each of said aneroids actuating its respective second stage metering valve through one of said plurality of diaphragms and the area ratios of said plurality of diaphragms to said aneroids being different whereby one of said second stage metering valve-aneroid combinations opens during low altitudes to provide a substantially flat performance curve and another of said second stage metering valve-aneroid combinations takes over and opens during higher altitudes to provide a substantially steeper performance curve.

3. A regulator of the character disclosed comprising a first stage chamber, an outlet chamber, a first stage back pressure chamber, a first stage valve for admitting oxygen to said first stage chamber, a diaphragm between said first stage chamber and said first stage back pressure chamber, and operatively connected to said first stage valve to control the same, a plurality of second stage valves between said first stage chamber and said outlet chamber, a pair of diaphragms between said outlet chamber and atmosphere, an aneroid for each of said second stage valves to open the same upon increase in altitude, each of said aneroids actuating its respective second stage valve through one of said pair of diaphragms and the area ratios of said pair of diaphragms to said aneroids being different whereby one of said second stage valve-aneroid combinations opens during low altitudes and the other of said second stage valve-aneroid combinations opens during higher altitudes and passage means communicating said first stage back pressure chamber with said outlet chamber.

4. In an altitude compensated continuous flow oxygen regulator, a first stage chamber, an outlet chamber and a first stage back pressure chamber, a first stage valve, a diaphragm between said first stage chamber and said first stage back pressure chamber, and operatively connected to said first stage valve to control the same, a plurality of second stage valves between said first stage chamber and said outlet chamber, a diaphragm for each of said second stage valves and located between said outlet chamber and atmosphere, an aneroid for each of said second stage valves to open the same upon increase in altitude, each of said aneroids actuating its respective second stage valve through its respective diaphragm and the area ratios of said second stage diaphragms to said aneroids being different whereby said second stage valves are opened sequentially upon said regulator being subjected to increasing altitude and passage means communicating said first stage back pressure chamber with said outlet chamber.

5. In an oxygen regulation system of the character disclosed, a plurality of metering valves between an oxygen supply chamber and an outlet chamber of the system, said outlet chamber being connected to passenger outlets each having a metering orifice, an aneroid responsive to altitude for actuating each of said metering valves, diaphragms through which said aneroids act upon said metering valves, said diaphragms being of different areal relationships relative to their respective aneroids and responsive on one side to the pressure in said outlet chamber and on their other side to ambient altitude whereby said metering valves operate sequentially during an increase of altitude, the one of less ratio relative to its aneroid acting first and the one of greater ratio then taking over in order to modify the performance curve of said oxygen regulation system to conform substantially to a desired performance curve.

6. In an oxygen regulation system of the character disclosed, a plurality of metering valves between an oxygen supply chamber and an outlet chamber of the system, said outlet chamber being connected to passenger outlets each having a metering orifice, an aneroid responsive to altitude for actuating each of said metering valves, diaphragms through which said aneroids act upon said metering valves, said diaphragms being of different areal relationship relative to their respective aneroids and responsive on one side to the pressure in said outlet chamber and on their other side to ambient altitude whereby said metering valves operate sequentially during an increase of altitude.

7. An oxygen regulator of the character disclosed comprising an oxygen supply chamber, an outlet chamber, a plurality of metering valves between said chambers, said outlet chamber being adapted for connection to passenger outlets having metering orifices, an aneroid responsive to altitude for actuating each of said metering valves, a diaphragm for each metering valve through which said aneroids act upon said metering valves, said diaphragms being of different areal relationships relative to their respective aneroids and responsive on one side to the pressure in said outlet chamber and on their other side to ambient altitude.

8. An oxygen regulator of the character disclosed comprising a housing divided to provide first stage, outlet and first stage back pressure chambers, a first stage valve between a source of oxygen supply and said first stage chamber and controlled by a diaphragm responsive on one side to pressure within said first stage chamber and on its other side to pressure within said first stage back pressure chamber, said outlet chamber communicating with said first stage back pressure chamber to modify the action of said diaphragm depending upon the pressure in said outlet chamber, a plurality of second stage metering valves between said first stage chamber and said outlet chamber, an aneroid for actuating each thereof, and means for modifying the action of said aneroids comprising diaphragms responsive on one side to altitude and on their other side to the pressure in said outlet chamber, said diaphragms being of different areal ratios relative to said aneroids whereby the diaphragms and aneroids operate said second stage metering valves sequentially to provide a performance curve which is a composite of the performance curve of the diaphragm and aneroid operated second stage valve having the lower ratio and then the diaphragm and aneroid operated second stage valve having the higher ratio.

9. An oxygen regulator comprising a housing divided to provide first stage and outlet chambers, a first stage valve between a source of oxygen supply and said first stage chamber, a diaphragm responsive on one side to pressure within said first stage chamber and on the other side to biasing means, said diaphragm being operatively connected to said first stage valve to control the same, a plurality of second stage metering valves in parallel relationship between said first stage chamber and said outlet chamber, an aneroid for actuating each thereof, said aneroids being also in parallel relationship, and means for modifying the action of said aneroids comprising diaphragms responsive on one side to ambient pressure and on their other side to the pressure in said outlet chamber, said diaphragms being in parallel relationship and of different areal ratios relative to said aneroids.

References Cited in the file of this patent
UNITED STATES PATENTS

| | | |
|---|---|---|
| 2,306,382 | Fink | Dec. 29, 1942 |
| 2,466,582 | Dillman | Apr. 5, 1949 |
| 2,630,129 | Holmes | Mar. 3, 1953 |